June 17, 1952 S. MAYNER 2,601,045
FLUID POWER TRANSMISSION

Filed June 29, 1949 2 SHEETS—SHEET 2

INVENTOR.
STANLEY MAYNER
BY
Thomas S. Mayner
ATTORNEY

INVENTOR.
STANLEY MAYNER

Patented June 17, 1952

2,601,045

UNITED STATES PATENT OFFICE 2,601,045

FLUID POWER TRANSMISSION

Stanley Mayner, Cleveland Heights, Ohio, assignor of two-fifths to Thomas S. Mayner, Russel Township, Ohio Application June 29, 1949, Serial No. 102,007

11 Claims. (Cl. 74—677)

This invention relates to fluid power transmitting apparatus and more particularly to a variable torque and speed power transmission that is automatically subject to operating conditions.

Generally not all hydraulic torque converters having mechanical transmissions provide for a uniform flow of power from between their greatest torque ratio to the coupling stage. Where for greater torque output two planetary systems comprise the attached mechanical transmission there sometimes occurs an uneven transition of load from the one planetary system to the other upon acceleration or deceleration. In vehicles that utilize such converters the load transition point is noted by pronounced hesitation in forward motion and a lessening in acceleration. Means are provided in some transmissions to shift the load from speed range to speed range.

The power transmitting apparatus of this invention advantageously provides for a uniform torque and speed change from the highest designed torque ratio to a coupling stage. The change in torque requirements is effected smoothly and uniformly over the entire range, and without the use of external automatic devices subject to speed ranges.

The apparatus comprises a hydraulic torque converter having at least two turbines, rotating oppositely, and transmission gearing comprising at least two planetary systems positioned in series relation. The reactions of the turbines are taken exteriorly of the hydraulic converter, and the planetary systems are arranged in a manner uniformly and automatically adjustable to torque requirements. Further, the apparatus is adapted to reversely drive the output shaft, and entirely through gearing.

Figure 4:
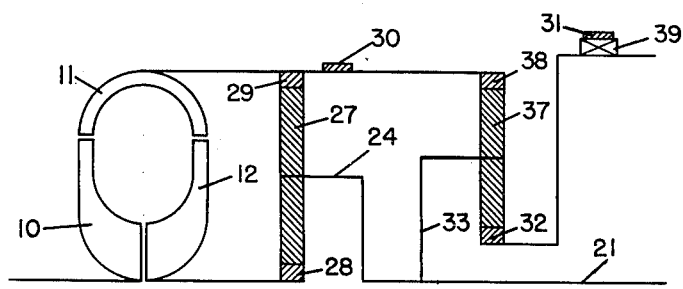
Figure 5:
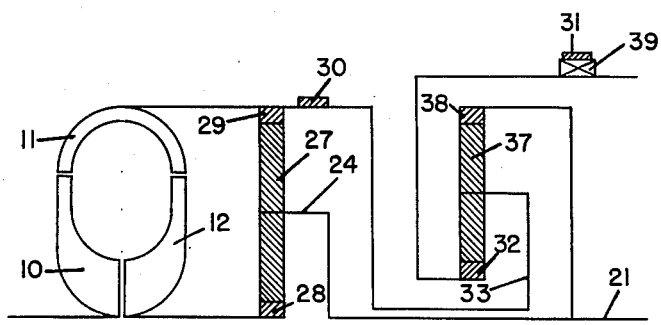
Figure 6:
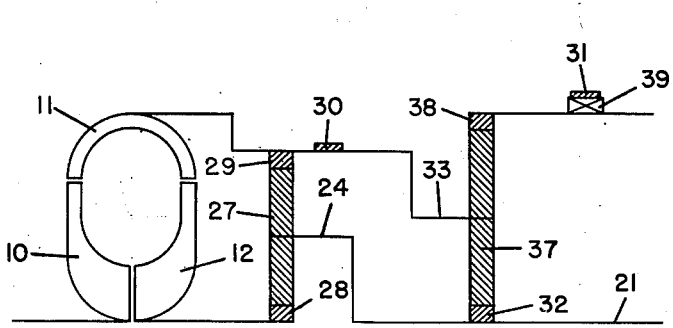
Figure 4:
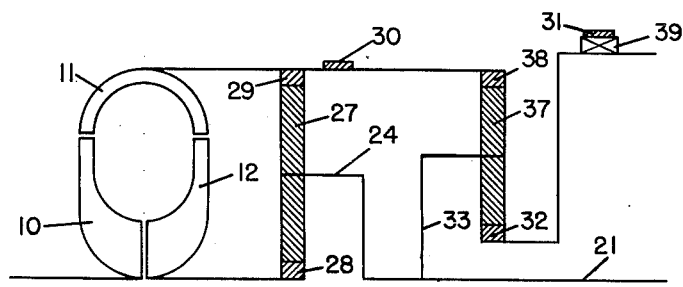
Figure 5:
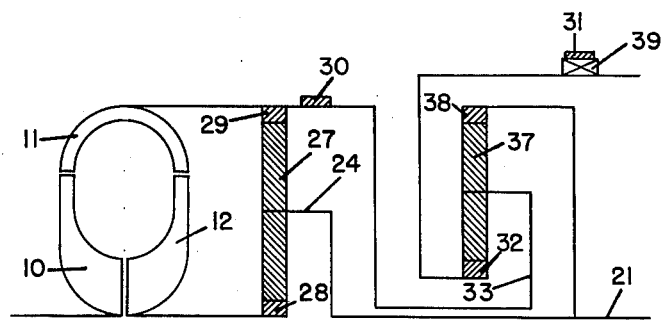
Figure 6:
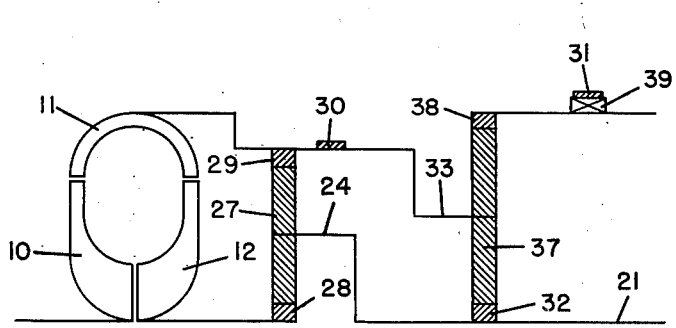

The power transmitting apparatus, and its advantages, is more fully explained in the following specification and in the accompanying drawing where:

Figure 1 is a sectional view of the hydraulic torque converting and power transmitting apparatus;

Figures 2 and 3 represent sections of the planetary systems taken along lines 2—2 and 3—3 respectively;

Figure 4 is a diagrammatic representation of a modification of the apparatus of Figure 1, and Figures 5 and 6 are further diagrammatic representations of modifications of the apparatus of Figure 1.

Referring to the drawing the hydraulic torque converter power transmitting apparatus of Figure 1 is adapted to be driven by a prime mover (not shown) through a connecting shaft 9. To the shaft 9 there is attached by splines or a key, or through some other convenient manner, an impeller 10. Adjacent the impeller 10 there is positioned a fluid receiving and reversing turbine 11, and at the outlet end of the turbine 11 there is positioned a second turbine member 12. When under load the turbine member 12 rotates in an opposite direction to the turbine 11 being driven by the reversed fluid from the latter.

Advantageously, turbine 11 is adapted to be incorporated in the converter housing 14. The turbine is desirably of the arrangement shown in the Mayner Patent 2,432,115. The outer walls of the plurality of fluid receiving and reversing buckets that form the turbine are exposed to the atmosphere, and whatever heat is generated during the operation of the device is substantially immediately dissipated to the atmosphere. The housing 14 also encloses the impeller 10 and the secondary reversely rotating turbine 12. To the housing 14 there is attached a planetary housing or casings 22 and 31. The transmission is supported about the input shaft 9 on bearings 16 and about the output shaft on bearings 42 and 43. Also the secondary turbine rotates on bearings 17 positioned about aligned input and output shaft ends.

The first associated planetary gear system comprises a sun gear 28 that is joined to the second turbine member 12, planet gears 27 that are supported in a gear carrier 24 on stub shafts 26, and annular gear 29. The gear carrier 24 is advantageously secured to the output shaft 21 by such means as a key 25 or in some other convenient manner. The planet gears 27 are adapted to rotate within the ring or annular gear 29 which may form a part of, or that may be integrated in the planetary casing 22. The arrangement permits the turbine 12 to drive the sun gear and therethrough the planets 27 and the gear carrier 24, or the turbine 11 may drive the planets or their carrier through the annular gear, or both turbines can do the driving.

The second planetary system is in a series relation with the described planetary system. The gear housing or casing 22 is adapted to move relative to the gear housing 31 which is stationary. A seal 60 is provided between the two housings. In the second planetary system the sun gear 32 is attached to the first planet casing 22 or to the first annular gear 29 and therethrough to the converter housing 14 incorporating the primary turbine 11. The planet gears 37 are supported in a gear carrier 33 on stub shafts 34. The gear carrier 33 is attached or keyed to the output shaft 21 at 35. The planets 37 rotate within a ring or annular gear 38. Further there is positioned about the ring or annular gear 38 a one-way brake 39 and a manually operated brake band 40. The brake band 40 is adapted to release or hold the one-way clutch brake 39. The one-way brake 39 permits a selective driving of the output shaft 21 through the second planetary system at reduced speeds as will be hereinafter explained. There is also provided a braking device 30 about the housing 22 for purposes of providing a reverse drive as will be also hereinafter explained.

From the aforesaid description it is to be noted that both planetary gear carriers are secured to the output shaft 21; also, that the annular gear 29 of the first planetary system and the sun pinion 32 of the second planetary system are attached to the first turbine member 11. The first sun gear 28 is however attached to the second reversely rotating turbine 12 while the second sun gear 32 is attached to the first turbine 11. Reaction for both turbines is provided by the second annular gear 38 which is provided with the one-way brake 39 having the hold or releasing means 40 that is subject to manual operation. Such an arrangement provides for a smooth and an automatic adjustment of torque requirements placed on the output shaft 21.

In operation starting from a standstill position the impeller is accelerated to force fluid through the first turbine 11 to drive the second turbine 12 in a reverse direction. The turbine 12 will readily respond since it is connected to the sun gear 28 having a small diameter relative to the diameter of the annular gear 29. The second turbine actuates or drives the planet gears 27 which react against the annular gear 29 to rotate the planet carrier 24 and therethrough the output shaft 21. Because of the substantial diameter differences between the ring and annular gears a substantial torque is imparted to the output shaft 21. As the output shaft increases in rotation the first turbine also increases in rotation and the attached annular gear 29 increasingly drives the planets 27. Both the annular gear and the sun gear drive the planets so long as there is opposite rotation between the turbines, the forces of both turbines being combined by the planets to drive the output shaft 21 through the planet carrier 24. When relative rotation between the turbines disappears then the planets are driven by the first turbine and its attached annular gear 29, or upon starting by the second turbine and its attached sun gear 28. There is thus a transition of the load from the second to the first turbine.

There is a substantially immediate rotation of the annular gear 29 and of the second sun gear 32 inasmuch as pinion or sun gear 28 is adapted to drive the annular gear through the planets 27. Thus the torque on the second turbine 12 is transmitted to the shaft 21 through both planet carriers.

As the first turbine 11 increases in rotation it also increasingly drives the second pinion 32 since the two are connected. The second pinion 32 drives the planets 37 which react against the held annular gear 38 or reaction member. The planets in turn rotate their carrier 33 and therethrough the output shaft 21. Both planet carriers 24 and 34 are fixed to the output shaft 21 and the force of each is imparted to the shaft to drive it.

The turbine 11 upon starting speeds and for a while thereafter while increasing in rotation serves somewhat as a reaction turbine redirecting the fluid into the secondary turbine 12 to drive the secondary turbine in an opposite and normal direction. The action of both driven members is combined into a single force which in turn drives the second sun pinion 32, the planets 37 and the carrier 33. The reaction of both turbines is taken in the annular or ring gear 38 to which is attached a one-way brake 39. The ring gear 38, being held, effects the rotation of the planet gears 37 within it and also of the planet gear carrier 33 to drive the output shaft 21.

As the load on the unit decreases the secondary turbine 12 gradually stops its opposite rotation. Meanwhile the first turbine 11 is increasing in speed of rotation and eventually absorbs the reverse force component that initially drove the secondary turbine 12. Then, since the first sun pinion 28 no longer exerts a force on the first planets and assumes a speed substantially to that of the first ring or annular gear 29 the entire planet system tends to rotate as a unit along with the secondary planet system to drive the output shaft 21 through the first planet gear carrier 26 which is attached to the shaft at 25. As the first turbine assumes the total load the second turbine slows in rotation then to reverse its direction to follow the first turbine. The sun gear 28 and the annular gear 29 become as a unit to drive the carrier 24 and the shaft 21. The second planet system during this coupling period is adapted to merely follow inasmuch as there is no longer a differential rotation of the turbines and the ring or annular gear 38 is no longer necessary as a reaction gear.

As stated the second planet system when the transmission becomes a coupling will rotate in a forward direction as the rest of the unit and the first planet system assumes the entire load. The second annular gear 38 by being associated with the one-way brake 39 is controlled in the direction of rotation being adapted to rotate freely only in the forward or normal direction. When the apparatus is under load the one-way brake will hold the ring gear 38 to provide reaction for the turbines; and when the load is off the apparatus the second planet system and the ring gear 38 are released to rotate in a forward direction.

Advantageously, the construction of the first planet system can be such so that the second turbine 12 can have a sun gear of a size which will give the turbine whatever leverage may be desired. If desired, a larger leverage for turbine 12 than that of the first turbine 11 will bring about a coupling status more quickly.

To reduce the speed of the power apparatus the band brake 30 about the housing 22 is applied to slow down the first turbine 11, or to entirely stop it. When the brake 30 is applied the driven shaft 21 tends to become a driving shaft to increasingly drive the second turbine 12 in the direction of its rotation. The second turbine then tends to drive the fluid at a higher rate and higher torque against the impeller 10, the first turbine assuming a reaction status because of being braked, to retard the prime mover. Of course the degree of retardation is varied with the application of the brake. If it is desired to substantially completely stop the unit the impeller can be accelerated to offset the action of the second turbine, a counter-reaction being also established in the first planet system inasmuch as the ring gear 29 will provide reaction to give a high braking leverage for the sun gear 28.

For a reverse rotation of the output shaft 21 the first brake band 30 is applied to desirably stop the first turbine 11 to make of it a reactor to redirect the fluid against the second turbine 12. The turbine 11, as described in the Mayner Patent No. 2,432,115, substantially fully reverses the flow of the fluid that it receives from the impeller 10 to drive the second turbine in an opposite or reverse direction to itself, or to the impeller. With the brake 39 being held in an inoperable position which permits only forward rotation of the shaft, the shaft 21 will rotate in a reverse direction when the reaction for the planets 27 is provided by the held orbit gear 29. The second turbine will then drive the attached sun gear 28 which in turn will drive the planets 27 to drive the gear carrier 24 in a reverse direction. Since the gear carrier 24 is keyed to the output shaft it will also drive the shaft in a reverse direction. The second planet system will merely rotate because the one-way brake 39 during reversals is rendered inoperable.

Further, should it be desired to drive the output shaft through the second planetary unit instead of the entire apparatus there is provided an arrangement for a positive reduced drive. A jaw-clutch 51—52 actuable by means of a yoke (not shown) positioned in the collar 50 is mounted about the input shaft 20; part 51 being slidably mounted on the input shaft as on splines, and part 52 being attached to the housing 14. When the jaw clutch section 51 is thrust into engagement with the clutch section 52 a positive connection is made with the drive shaft 20. The drive shaft 20 then directly drives the housing 14, the second sun gear 32, the planet carrier 33 through the planet gears 37 which react against the locked annular gear 38 and the output shaft at, of course, a reduced speed. A positive drive is advantageous in the event of stalling and starting, etc. because of faulty starting equipment.

Another advantage of the planet arrangement is one which enables the load on the converter to be split. Some load, under this arrangement, is adapted to be taken by the hydraulic unit in the form of a coupling while the rest of the load is taken by the gearing. Should it be desired to drive the output shaft in the aforesaid manner the jaw clutch 51—52 is engaged and the brake 31 is actuated to hold the one-way brake 39 in a released position to allow the second planetary system to rotate freely or float. The load is then placed on the hydraulic unit and the first planet system. Since the driving shaft is directly connected to drive the planetary gears 27, the planet gears 27 will also drive the pinion 28 reversely as well as the annular gear 29 to drive the second turbine 12 and the first turbine 11, the two turbines being coupled. Most of the load is, of course, on the planet system and transmitted therethrough to the output shaft. Such an arrangement provides for a substantially more efficient coupling.

A neutral or no-drive position of the unit, advantageously is readily had by releasing the one-way brake 39. The release of the brake takes away the reaction for the second planetary gear system, the annular gear 38 being permitted to rotate freely and in a reverse direction. The force on the hydraulic unit is thus dissipated and even though there may be a drag it is usually not great enough to cause the shaft to rotate when it may be under some load.

The gearing or the planetary systems can be connected to the turbine members in a different manner than herein described. The hydraulic unit can be associated with the following modified gearing arrangements without departing from the scope of the invention. The first turbine, as shown in Figure 4 of the drawing, is also joined to the ring or annular gear 38 of the second planet system and the pinion 32 is connected to the one-way clutch or brake. The planet gears 37 are supported in the carrier 33 that is keyed to the output shaft 21. The first planet system is associated with the second turbine in the similar manner described and shown in Figure 1. This arrangement will provide for higher reverse drive torque ratios than the first described arrangement since the reaction is taken about the sun pinion 32 and not about the annular gear 38.

In the further modification of Figure 5 the reaction gear in the second planet system is the pinion 32 while the planet carrier 33 is connected to the first turbine 11 and not to the output shaft 21. The annular gear 38 is connected to the output shaft 21. This arrangement will provide for greater forward torques.

A still further modification is shown in Figure 6. The first turbine 11 is joined to the gear carrier 33, and the sun gear 32 is keyed directly to the output shaft 21. The annular gear 38 is checked by the one-way brake 39 as in Figure 1. This arrangement also provides for increased forward torque output.

I claim:

1. A fluid power transmission comprising, a power input shaft, an impeller attached to said input shaft, a first turbine, a second oppositely rotating turbine, said impeller and first and second turbines being in the same fluid circuit, first and second planetary gear systems in a series relation associated with said turbines, one of said turbines being adapted to drive a gear member in each of said planetary systems, the other of said turbines being attached and adapted to drive a gear in the first of said planet systems, means in said second planet system for providing reaction for said turbines, and an output shaft, said output shaft being driven by the planet gears of said planetary systems.

2. A fluid power transmission comprising, a power input shaft, an impeller attached to said input shaft, a first turbine, a second oppositely rotating turbine, said impeller and first and second turbines being in the same fluid circuit, a first and second planetary gear system associated with said turbines, said planetary systems having as members sun, planet and annular gears in meshing relation, said first turbine being attached to the annular gear of said first planetary system and to a member of the second planetary system, said second turbine being attached to the sun gear of said first planetary system, a second member of said second planet system being adapted to be held as a reaction member, means for holding said second member of said second planet system, and an output shaft being driven by the planet gears of said first planet system and the third member of the second planet system.

3. A fluid power transmission comprising, a power input shaft, an impeller attached to said input shaft, a first turbine, a second oppositely rotating turbine, said impeller and first and second turbines being in the same fluid circuit, a first and second planetary gear system associated with said turbines, said systems having as members, sun, planet and annular gears in meshing relation, said first turbine being attached to the annular gear of said first planetary system and to a member of the second planetary system, said second turbine being attached to the sun gear of said first planetary system, a one-way brake being associated with said second member of said second planetary system to limit its rotation to one direction, means for holding or releasing said one-way brake, and an output shaft joined to both planet systems being driven by the planet gears of the first planet system and the third member of the second planet system.

4. A fluid power transmission comprising, a power input shaft, an impeller attached to said input shaft, a first turbine, a second oppositely rotating turbine, said impeller and first and second turbines being in the same fluid circuit, a first and second planetary gear system associated with said turbines, said systems having as members sun, planet and annular gears in meshing relation, said first turbine being attached to the annular gear of said first planetary system and to a member of the second planetary system, means for holding said first turbine and said annular gear, said second turbine being attached to the sun gear of said first planetary system, a one-way brake being associated with the annular gear of said second planet system, means for holding or releasing said one-way brake, an output shaft, and said output shaft being joined to the planet gears of each of said planet systems.

5. A fluid power transmission comprising, a power input shaft, an impeller attached to said shaft, a first turbine, a second oppositely rotating turbine, said impeller and first and second turbines being in the same fluid circuit, a first and second planetary gear system associated with said turbine, said first turbine being attached to the annular gear of said first planetary system and to a gear member of said second planetary system, said second turbine being attached to the sun gear of the first planetary system, a reaction means in said second planetary system for said turbines, output shaft joined with both said planetary systems and being driven thereby, and a positive locking clutch having a member positioned about the input shaft and laterally movable thereon and rotating therewith and a second engageable member attached to said first turbine, said members being adapted to be joined upon axial movement of the first into engagement with the second to thereby drive the output shaft through planet gearing and through the turbines.

6. A fluid power transmission comprising, a power input shaft, an impeller attached to said input shaft, a first turbine, a second oppositely rotating turbine, said impeller and first and second turbines being in the same fluid circuit, a first and second planetary gear system associated with said turbines, said systems having as members sun, planet and annular gears in meshing relation, said first turbine being attached to the annular gear of said first planetary system and to a member of the second planetary system, said second turbine being attached to the sun gear of said first planetary system, a one-way brake being associated with the annular gear of second planet system, means for holding or releasing said one-way brake, an output shaft, said output shaft being joined to the planet gears of each of said planet systems, and holding means for said first annular gear, said holding means effecting a reaction member of said annular gear for the planet gears of the first planetary system when said one-way brake is rendered inoperable.

7. A fluid power transmission comprising, a power input shaft, an impeller attached to said input shaft, a first turbine, a second oppositely rotating turbine, said impeller and first and second turbines being in the same fluid circuit, a first and second planetary gear system, a member of said first planetary gear system being connected to a member of said second gear system, said first turbine and second turbines each being attached to a member of said first planetary system, means for holding a member of said second planetary system as a reaction member for the planetary gear systems, and an output shaft being adapted to be driven by said planetary systems.

8. A fluid power transmission comprising, a power input shaft, an impeller attached to said input shaft, a first turbine, a second oppositely rotating turbine, said impeller and first and second turbines being in the same fluid circuit, a first and second planetary gear system, a member of said first planetary gear system being connected to a member of said second gear system, said first turbine and second turbines each being attached to a member of said first planetary system, means for holding said first turbine and a member of said first planetary system, means for holding a member of said second planetary system as a reaction member for the planetary gear systems, and an output shaft being adapted to be driven by a member of each of said planetary systems.

9. A fluid power transmission comprising, a power input shaft, an impeller mounted about and secured to said shaft, a first turbine, a second turbine, said impeller and first and second turbines being in the same fluid circuit, a first rotating planetary gear system having orbit, planet, and sun gears in meshing relation, said first and second turbines each driving member gears in said first planetary system and their torque being impressed upon the remaining gear in said planetary gear system, a second rotating planetary gear system joined to said first rotating planetary gear system and driving a gear member thereof, and having a holding means adapted to hold one of its gear members to provide reaction for said first rotating planetary system, and a power output shaft driven by the first and second planetary systems.

10. A fluid power transmission comprising, a power input shaft, an impeller attached to said shaft, a first turbine, a second oppositely rotating turbine, said impeller and first and second turbines being in the same fluid circuit, a first rotating planetary system combining the torque output of said oppositely rotating turbines, a second rotating planetary system attached to the first and being driven thereby for providing reaction for the turbines, and holding means for one of the members of the second planetary system to provide reaction for planetary systems, and an output shaft driven by said planetary systems.

11. A fluid power transmission comprising, a power input shaft, an impeller attached to said power input shaft, a first turbine, a second oppositely rotating turbine, said impeller and first and second turbines being in the same fluid circuit, a first rotating planetary system having orbit, planet, and sun gears connected to said turbines for combining their torque output, the orbit gear being attached to the first turbine and the sun gear being attached to the second oppositely rotating turbine, an output shaft, a planet gear carrier secured to the output shaft, planet gears being in meshing relation with said rotating orbit and sun gears mounted in said gear carrier, a second rotating planetary system being connected to the first planetary system providing reaction for the said oppositely rotating turbines, a holding means positioned about the orbit gear of said second planetary system to hold the orbit gear from rotation, a sun gear in said second planetary system being joined to the orbit gear of the first planetary system for simultaneous rotation therewith, and a planet gear carrier mounted on the output shaft, said carrier mounting the planet gears of said second planetary system, said planet gears being in mesh with said orbit gear having holding means and the sun gear.

STANLEY MAYNER.

REFERENCES CITED

The following references are of record in the file of this patent:

UNITED STATES PATENTS

| Number | Name | Date |
|---|---|---|
| 2,326,994 | Duffield | Aug. 17, 1943 |
| 2,350,810 | Pentz | June 6, 1944 |
| 2,388,062 | Keller | Oct. 30, 1945 |
| 2,395,459 | Carnagua | Feb. 26, 1946 |
| 2,456,328 | Schneider | Dec. 14, 1948 |